May 26, 1959 R. W. TIMMERMAN ET AL 2,888,329
METHOD OF PRODUCING CARBON DISULFIDE
Filed Aug. 10, 1955
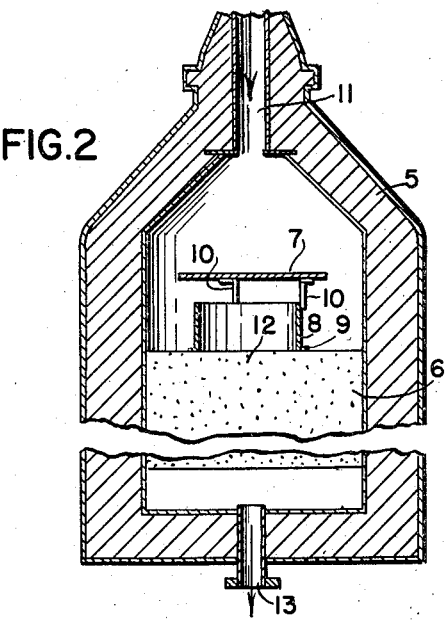
FIG.2
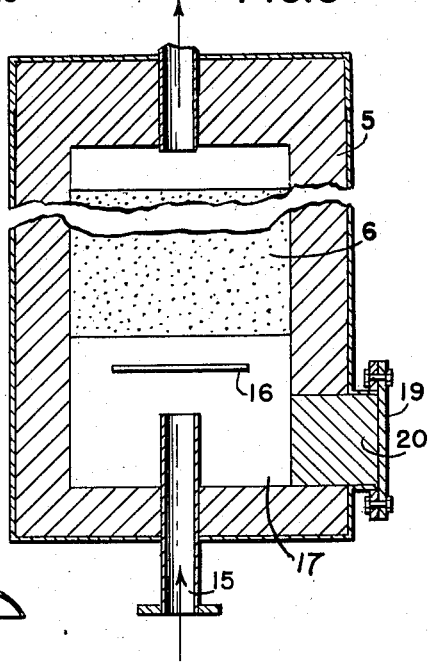
FIG.3
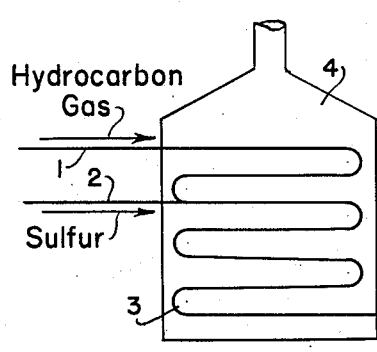
FIG.1
FIG.4
INVENTORS
Robert W. Timmerman,
Harry C. Kutz
BY
ATTORNEYS

United States Patent Office 2,888,329
Patented May 26, 1959

2,888,329

METHOD OF PRODUCING CARBON DISULFIDE

Robert W. Timmerman and Harry C. Kutz, Charleston, W. Va., assignors to Food Machinery and Chemical Corporation, New York, N.Y., a corporation of Delaware Application August 10, 1955, Serial No. 527,594

1 Claim. (Cl. 23—206)

This invention relates to an improvement in the production of carbon disulfide by the reaction of sulfur vapor and hydrocarbon gases at temperatures between 450° and 700° C.

In the usual processes of producing carbon disulfide by the reaction of sulfur vapor and hydrocarbon gases the sulfur and hydrocarbon gases are heated to a temperature between 450° and 700° C. and passed through reactors containing porous beds which may or may not be of catalytic material.

In the heating of the sulfur vapor and hydrocarbon gases some solids are produced from carbonaceous material in the sulfur and by carbonization of the hydrocarbon gases. Sulfur vapor at this temperature is very corrosive and a substantial amount of scale is formed on the inside of the heating surfaces which becomes detached by the flow of the gas streams therethrough and when the heated gases containing these solid particles are passed through the porous beds of the reactor the solids in the gases deposit in the reactor beds and lead to plugging, rapid increase in pressure and other objections.

It is one of the objects of the present invention to provide a method of separating the solids entrained in the gas stream from the gases within the reactors in such a manner as to prevent plugging of the porous reactor beds by the solids separated from the gas stream.

Another object of the invention is to provide a method by which plants used for the production of carbon disulfide by the above-described method may be kept in operation for a longer period of time.

Another object of the invention is to provide a method by which the solids separated from the gas streams in the reactors may be removed from the reactors without major dismantling of the reactors and porous beds therein.

Various other objects and advantages of the invention will appear as this description proceeds.

Referring now to the drawings which illustrate preferred embodiments of our invention, Fig. 1 is a diagrammatic view of one form of heater and reactor illustrating the general process of producing carbon disulfide by the method above-described.

Fig. 2 is a sectional view through one form of reactor chamber in which the method of our invention may be practiced.

Fig. 3 is a diagrammatic sectional view through another form of reactor in which the process of our invention may be practiced, and Fig. 4 is a detail view of a modified form of baffle plate.

In the embodiment illustrated in Fig. 1, the sulfur and hydrocarbon gases, usually consisting principally of methane, are shown as passing through the lines 1 and 2 respectively and into a series of heater tubes 3 in the furnace 4. While any type of heating may be used, it is preferred to use heating tubes of corrosion-resistant metal. The furnace 4 may be heated by any suitable heating means to temperatures between 450° and 700° C. so that in passage through the heating surfaces in the heater, the sulfur and hydrocarbon gases are heated to a reaction temperature preferably around 600° to 625° C. From the heater 4 the gases pass through a reactor or series of reactors 5 containing beds of porous material 6 which may or may not be of catalytic material. The gases may flow through the reactors 5 in either a downflow or upflow direction.

If the beds 6 are of catalytic material they are usually of finely divided silica gel, fuller's earth, activated alumina or catalytic clays of a porous nature, and if the beds 6 are of non-catalytic material they are usually of porous material such as tile, beryl saddles or the like. If means are not provided to prevent plugging of the porous beds 6 they will become plugged, making a plant shutdown necessary for cleaning the reactor or reactors. Normally a minimum of three to five days is required for cooling, cleaning the reactors and restarting the plant so that such interruptions are to be avoided if possible.

In the method according to our invention as illustrated more particularly in Fig. 2, which shows a downflow reactor, a baffle plate 7 is located in the top portion of the reactor 5 and a chimney or cylindrical member 8 of smaller diameter than the baffle 7 rests upon feet 9 on the top of the catalyst bed 6. The plate 7 may be supported in any suitable manner within the reactor 5. In the specific embodiment of Fig. 2, it is shown as resting upon lugs 10 secured to the top of the cylindrical chimney member 8, although the baffle plate may be suspended from the top of the reactor, or supported in any other manner.

In one specific embodiment of the use of our invention, the reacting gases containing solids therein enter the passage 11 in the top of the reactor at a velocity of about 74 feet per second. The reaction gases then spread into the body of the reactor which is of a diameter substantially nine times the diameter of the inlet pipe, and their velocity is reduced to about 0.9 foot per second. Due to the reduction in velocity and the location of the baffle 7, substantially all of the solids passing into the reactor separate out of the gas stream and are deposited in the top portion of the reactor around the outside of the chimney 8. The gas passes around the edge of the baffle 7 at a velocity of about 1.6 feet per second and inward through the space between the top of the chimney 8 and the baffle plate 7 at a velocity of about 4.5 feet per second and downward through the center portion 12 of the catalyst bed 6. In passing around the edges of the baffle plate 7, the solids drop into the space between the walls of the chimney 8 and the walls of the reactor 5 and gradually accumulate in this space while the gases, freed from solids, pass through the inside of the chimney 8 and the center of the bed 6 where they again spread to the diameter of the reactor 5 and pass on through the reactor and out through the passage 13 to the recovery section of the plant where the carbon disulfide is separated from any unreacted sulfur or hydrocarbon gases and from the hydrogen sulfide formed as a by-product of the reaction, and is recovered. The center portion 12 of the reactor bed inside the chimney 8 remains porous and open and the portion of the reactor bed between the outside of the chimney 8 and the walls of the reactor and below the bed of fine solids deposited on the top of this portion of the reactor bed also remains porous and open so that the gases, having passed through the inside of the chimney 8 can again spread outwardly and occupy the entire void space in the reactor beds.

Periodically the reactor may be opened and the solids which have accumulated in the space between the chimney 8 and the inner wall of the reactor 6 removed.

In the embodiment illustrated in Fig. 3, the heated gases enter through the inlet pipe 15 into the bottom of the reactor 5 where they encounter a baffle plate 16 and, due to the decrease in velocity of the gases on entering the reactor, the solids settle into the bottom 17 of the reactor in the space around the inlet pipe 15. The gases which pass through the beds 6 of catalytic or other packing pass out of the top of the reactor 5 to the recovery system in the manner previously described. The reactor of Fig. 3 is provided with one or more manhole openings 19 adjacent the bottom thereof and with removable insulation plugs 20. To clean the deposited solids from the reactor illustrated in Fig. 3, the covers 19 and insulating plugs 20 are removed and the deposited solids raked out or otherwise removed from the bottom of the reactor. Removal of the deposited solids in this way requires only a short shutdown period.

Fig. 4 illustrates a modified form of baffle 16a in the form of a cusped curve. This form of baffle may be used in place of baffle 16 as illustrated in Fig. 3 and is located in the reactor with the point 16b in the axis of the inlet 15. The shape of this baffle is such that it efficiently changes the direction of the gas flow and imparts a curved or umbrella-like path to the solid particles without materially decreasing the kinetic energy (velocity) possessed by the solid particles. Due to the curved path imparted to the solid particles by this type of baffle, a more efficient separation of the gases and solids is secured and the solids deposit more readily in the space between the inlet pipe 15 and the walls of the reactor. Various other baffle shapes, such as inverted cones or the like, may be used in place of baffles 16 or 16a to impart a curved path to the solids and promote better separation of the solids from the gas stream.

In all the embodiments, the gases entering the reactor are caused to change their direction of flow through an angle of approximately 90° and their velocity is reduced so that substantially all of the solid particles drop out of the gases before they enter the reactor bed.

In the methods illustrated in connection with Figs. 3 and 4, the velocity of the gases flowing into the reactors through the inlet 15 is reduced on entrance into the larger space of the reactor and the solids impinging on the baffle plates 16 or 16a tend to separate out of the gases and deposit in the space between the inlet pipe 15 and the walls of the reactors, while the gases, freed of solid particles, pass through the reactor beds which remain porous for substantially longer periods of time than if the solids in the gas stream were deposited therein.

By the use of the method described and illustrated in connection with Figs. 2, 3 and 4, it is possible to maintain the reactor or reactors in operation for substantially longer periods than would be possible if the gases containing entrained solids therein were permitted to flow directly through the beds of the reactors, as is shown by the following example.

*Example*

The pressure drop across a reactor not equipped with a baffle was 10 p.s.i on a certain date. Fourteen days later the pressure drop had increased to 37 p.s.i. although the gas flow had been decreased to 81% of the rate prevailing at the date of first measurement of the pressure drop. Shortly after the fourteen-day running period, it was necessary to shut down the plant to clean out the dirt accumulated on top of the catalyst bed in this reactor.

A baffle of the type illustrated in connection with Fig. 2 was then installed and operation resumed. After seven days the pressure drop across the reactor was 10 p.s.i. Forty-four days later the pressure drop had increased only to 14 p.s.i. with the gas flow at 86% of the volume of gas flow on the date the 10 p.s.i. pressure drop measurement was made. Nine days later the unit was shut down for inspection although a shutdown would not have been necessary for pressure drop reasons. Dirt and corrosion products were tightly packed in the annular space around the chimney 8 to a depth of several inches, however, very little obstructing material was present under the baffle plate 7 or inside the chimney 8 or on top of the baffle plate. Apparently the gas velocity had been sufficient to prevent accumulation of solids on top of the baffle plate. Deflection of solids to the outside walls of the reactor in the space between the reactor and the chimney was clearly evident.

While we have illustrated certain preferred methods for the practice of our invention, it will be understood that other baffle plate arrangements, such as cyclones, centrifugal separators, and the like, and other methods of separating entrained solids from the gas stream may be used within the spirit of our invention and the scope of the following claim.

We claim:

The method of reducing reactor plugging in a reactor used for the production of carbon disulfide by the reaction of sulfur vapor and hydrocarbon gases at temperatures between 450° and 700° C. and having a porous bed packing extending entirely across the reactor and into contact with the side walls thereof and spaced from the ends thereof which comprises passing the reacting gases through heaters maintained at temperatures between 450° and 700° C., and into the top of said reactor, retarding the flow of gases within said reactor, causing said gases to impinge upon a baffle plate located between the reactor inlet and the porous bed therein, deflecting solids present in said gases at an angle of substantially 90° to the direction of flow of the gas stream toward the walls of said reactor and depositing said solids on said porous bed in a zone adjacent the outer walls of said reactor while preventing deposition of said solids on said porous bed in the central zone of said reactor and while preventing lateral transfer of said solids between said two zones at the upper surface of said porous bed, and periodically opening said reactor and removing said deposited solids therefrom.

References Cited in the file of this patent

UNITED STATES PATENTS

| | | |
|---|---|---|
| 1,955,595 | Morley | Apr. 17, 1934 |
| 2,129,490 | Buchs | Sept. 6, 1938 |
| 2,209,973 | Houdry et al. | Aug. 6, 1940 |
| 2,317,449 | Flock | Apr. 27, 1943 |
| 2,330,934 | Thacker | Oct. 5, 1943 |